United States Patent [19]

Key et al.

[11] Patent Number: 4,895,048

[45] Date of Patent: Jan. 23, 1990

[54] POWERED ACTUATOR WITH MANUAL OVERRIDE FEATURE

[75] Inventors: Leland J. Key; Michael D. Harper, both of Dearborn, Mich.

[73] Assignee: United Technologies Electro Systems, Inc., Columbus, Miss.

[21] Appl. No.: 185,625

[22] Filed: Apr. 25, 1988

[51] Int. Cl.[4] .................................................. F16D 1/06

[52] U.S. Cl. .......................................... 74/625; 49/139; 74/405

[58] Field of Search ......................... 74/625, 411, 405; 49/139, 140

[56] References Cited

U.S. PATENT DOCUMENTS

| | | | |
|---|---|---|---|
| 3,203,690 | 8/1965 | Werner | 74/625 |
| 4,085,629 | 4/1978 | Fogarollo | 74/625 |
| 4,499,787 | 2/1985 | Leistner et al. | 74/625 |

FOREIGN PATENT DOCUMENTS

| | | | |
|---|---|---|---|
| 2743982 | 4/1979 | Fed. Rep. of Germany | 49/139 |
| 2809166 | 9/1979 | Fed. Rep. of Germany | 74/625 |
| 2489451 | 3/1982 | France | 74/625 |

*Primary Examiner*—Leslie A. Braun
*Assistant Examiner*—Scott Anchell

[57] ABSTRACT

A powered actuator (1) for driving mechanisms that open and close convertible tops, sunroofs, windows and the like in motor vehicles; in which actuator (1) has a manual override feature allowing actuator (1) to be easily operated by hand should the electrical power system of the motor vehicle fail, yet the manual override feature does not require calibration or periodic adjustment.

Actuator (1) includes actuator housing (2) having an attached motor having first gear (28) driven by the motor armature, output shaft (18) having driven gear (12) mounted thereon, insert cushion (10) being engaged with driven gear (12), and removable plate (6) being installed upon plate end (42) of output shaft (18). Actuator (1) is manually operated by removing removable plate (6) thereby disengaging driven gear (12) from output shaft (18) and then manually imparting rotation to plate end (42) of output shaft (18). Because driven gear (12) is disengaged from output shaft (18) in the manual mode, the motor armature does not resist the manually imparted rotation of output shaft (18).

1 Claim, 1 Drawing Sheet

POWERED ACTUATOR WITH MANUAL OVERRIDE FEATURE

DESCRIPTION

1. Technical Field

The field of art to which this invention pertains is powered actuators having manual overrides particularly suitable for use in motor vehicles, and specifically actuators powered by electric motors to drive mechanisms that open and close convertible tops, sunroofs, windows and the such.

2. Background Art

Automobile sunroofs, convertible tops, windows and the like are frequently equipped with an electric motor to drive an actuator which in turn, drives a mechanism that opens, retracts or closes sections of a roof, or that raises or lowers a convertible top, or opens and closes a window.

It is also a general practice to provide a manual override feature in case of motor failure or failure of the vehicle's electrical power system. A vehicle with a retracted roof and a dead battery along with an approaching rain storm would be an occasion where a manual override feature is desirable.

The electric motors generally used are small in order to conserve space and to minimize current draw on the vehicle's electrical power system, thus it is necessary to use actuators with high gear reductions (after a worm gear system). As a result of the high gear reductions, the motor armature cannot easily be manually backdriven, therefore, it is necessary to override the motor by effectively disconnecting the reduction gearing when operating the drive mechanism manually.

One known approach, that is presently in use, is an electric motor-powered actuator in which a slip clutch is physically connected between a set of reduction gears and an output shaft. The clutch not only serves to protect the reduction gearing by absorbing peak forces generated by sudden stoppages at the ends of mechanism travel, but also allows the actuator to be operated manually should the electric motor fail.

A slip clutch type actuator typically employs drive plates that are keyed to the output shaft by providing a flat portion on the output shaft to accommodate a flat sided mounting hole in each of the drive plates. The drive plates are continuously forced against the driven gear of the gear reduction set. The electric motor, upon being energized, drives the driven gear and the driven gear, in turn, imparts rotation to the output shaft via the drive plates due to the frictional forces between the drive plates and the driven gear being greater than the rotational forces being transmitted through the driven gear to the output shaft.

The slip clutch type actuator is manually driven by applying a wrench or an appropriate tool to an end of the output shaft and manually rotating the output shaft. Upon applying a predetermined amount of torque to the output shaft, the clutch "slips" and the output shaft rotates subsequently driving the mechanism which opens and closes the sunroof or the like, without backdriving (rotating) the reduction gears or the electric motor.

With the above approach, however, the internal friction of the slip clutch provides additional resistance that must be overcome in order to impart motion to the output shaft when operating in the manual mode. Additionally, if a slip clutch is used, it must be calibrated to slip when a predetermined amount of torque is applied to it, which results in increased manufacturing costs. Also, slip clutches may need to be adjusted periodically to compensate for wear.

DISCLOSURE OF THE INVENTION

An object of this disclosure is to provide an actuator that can be powered by an electric or hydraulic motor and that can be manually overridden with a minimum of effort should the motor be inoperable for whatever reason.

Another object of this disclosure is to provide an actuator that uses a resilient coupling in lieu of a slip clutch to absorb peak forces generated by sudden stoppages at the end of mechanism travel upon closing or retracting sunroofs, convertible tops, windows and the like.

A further object of this disclosure is to provide an actuator that uses a resilient coupling that not only requires fewer parts than a slip clutch, but it does not require calibration during assembly, nor does it need to be adjusted periodically to compensate for wear.

A yet further object of this disclosure is to provide an actuator that can be easily manually driven by providing a manual mode that alleviates the need to overcome the inherent resistance of backdriving reduction gears and motors.

The disclosure provides for a powered actuator employing a motor attached to a housing, said motor having an armature and a first gear driven by the armature. A shaft extends through the housing and the shaft has a pinion end, an intermediate bearing surface, and a plate end. A driven gear is mounted on the shaft and is positioned to coact with the first gear. An insert cushion is engaged with the driven gear and a removable plate is positioned to engage the insert cushion upon the removable plate being secured to the plate end of the shaft such that rotation of the driven gear causes rotation of the insert cushion which causes rotation of the removable plate and rotation of the shaft, and wherein should the motor fail, the actuator can be manually operated by removing the removable plate from the shaft thereby disengaging the driven gear from the shaft and allowing the plate end of the shaft to be rotated to impart motion to the shaft without rotating the driven gear or the motor armature.

The foregoing and other features and advantages of the present invention will become more apparent from the following description, drawings, and appended claims.

BEST MODE FOR CARRYING OUT THE INVENTION

Figure 1:
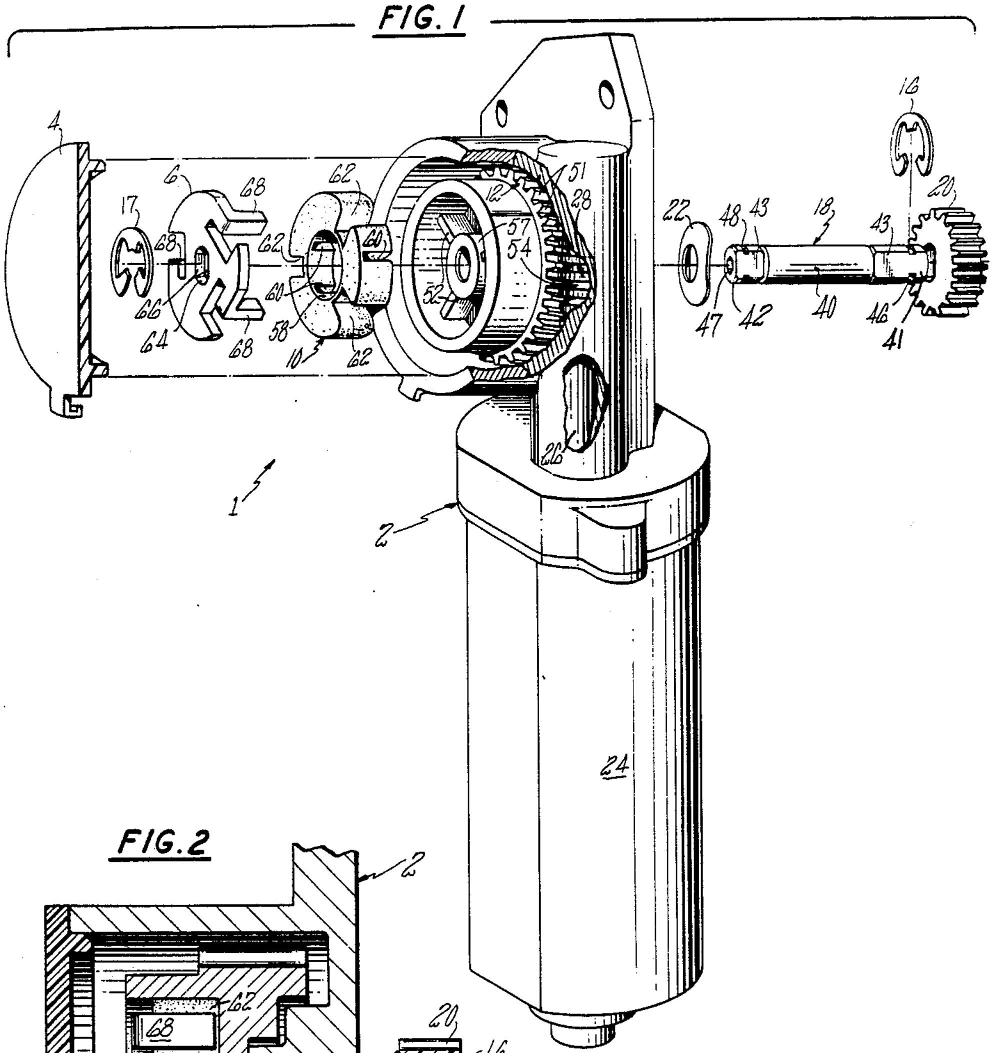
FIG. 1 is an exploded perspective view of an embodiment of the invention, including a portion of the actuator housing, output shaft, driven gear, insert cushion, removable plate, and housing cover.

Referring now to the drawings, FIG. 1 reveals an embodiment of the powered actuator assembly 1. Actuator housing 2 may be constructed of any material having the necessary rigidity and strength to accommodate a motor means 24 and various components to be located within the housing. The housing may be made from aluminum or other metals, however, materials such as RYNITE 935 have been found to be particularly suitable.

The motor means 24 may be any electric motor being compatible with the motor vehicle's electrical system, yet powerful enough with the mechanical advantage of gear reduction to actuate a sunroof mechanism, or the like. Alternatively, a hydraulic motor could be used for motor means 24. In order to conserve space, motor means 24 is secured to housing 2 so as to be perpendicular to bearing journal 50. However, the motor may be secured to the housing at any angle so as to meet the space restrictions of a specific application.

A first gear 28 is mounted upon armature 26 of motor means 24. First gear 28 meshes with driven gear 12 to form a reduction gear set. In this embodiment, first gear 28 and driven gear 12 are arranged in such manner that first gear 28 is a worm gear 54. As mentioned above, the gears may be cut for any desired angle for coinciding with the angle of the armature with respect to the driven gear.

Driven gear 12 has a centrally located axially positioned boss 57 with a hole forming a mounting bushing 56 for mounting driven gear 12 onto output shaft 18. Driven gear 12 may be constructed of any material suitable for gears, such as metal or plastic. Driven gear 12 has a plurality of raised ribs 52 extending radially and terminating short of gear teeth 51 of driven gear 12.

Output shaft 18 includes an intermediate bearing surface 40, a portion of which accommodates mounting bushing 56 and the remaining portion is received by bearing journal 50 located in housing 2. The as assembled positioning of output shaft 18 and driven gear 12 can be viewed in FIG. 2. Driven gear 12 is free to rotate about output shaft 18. Output shaft 18 can be constructed of any suitable material, such as cold rolled steel.

Returning to FIG. 1, pinion end 41 and plate end 42 of output shaft 18 have been machined leaving flat portions 43 that are opposite to each other. End 42 has a recessed portion 47 for accommodating a hex-headed, or allen-style wrench, a T-handle, crank or similar tool means (not shown). Alternatively, end 42 could employ a projecting hex-head for accommodating a corresponding spanner type wrench.

Figure 2:
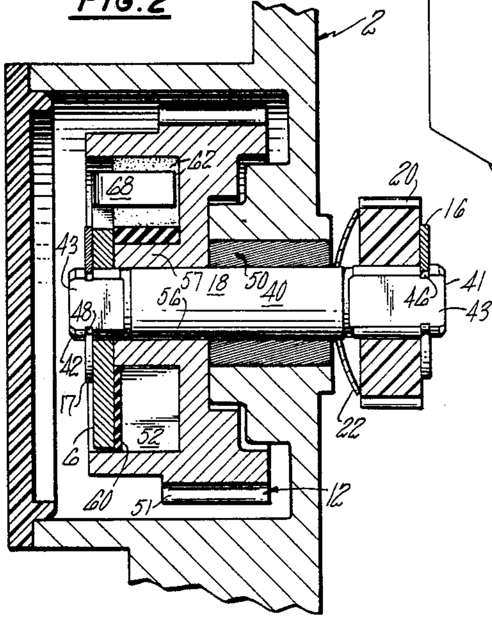
FIG. 2 is a sectional view of the actuator housing and components as assembled.

In FIG. 2, pinion gear 20 is fitted onto the flat portions 43 of pinion end 41 and is restrained axially by retaining ring 16 located in groove 46 of output shaft 18. Pinion gear 20 engages with the appropriate mechanism that will open and close a sunroof or the like.

Driven gear 12 is secured onto output shaft 18 by retaining ring 17 positioned in groove 48. Output shaft 18 is now axially restrained within the housing by retaining ring 17, driven gear 12, spring washer 22, pinion gear 20 and retaining ring 16.

Returning to FIG. 1, insert cushion 10 has a hole 58 of such diameter to clear boss 57 of driven gear 12 when insert cushion 10 is positioned adjacent to and is engaged with driven gear 12. Insert cushion 10 has radially extending rib slots 60 which accommodate corresponding ribs 52 projecting from driven gear 12. Additionally, insert cushion 10 has a plurality of recesses 62 being radially spaced from each other so as to occupy positions between adjacent rib slots 60. Insert cushion 10 may be constructed of any resilient material such as NEOPRENE.

Removable plate 6 is provided with mounting hole 64 having opposing flat portions 66 which are configured to be fitted onto the flat portions 43 of shaft end 42. Plate 6 has tabs 68 projecting outwardly and are spaced to engage the corresponding recesses 62 of insert cushion 10 when plate 6 is installed adjacent to insert cushion 10. Plate 6 may be constructed of any suitable material, such as steel.

Insert cushion 10 and plate 6 as installed can be viewed in FIG. 2. Retaining ring 17 is positioned in groove 48 and prevents driven gear 12, insert cushion 10, and plate 6 from being axially displaced from output shaft 18.

Access cover 4 is removably secured to the housing to seal the interior of housing 2. Access cover 4 may be made of any suitable material, such as metal or plastic. FIG. 2 shows access cover 4 in place.

If the electrical power source fails or the motor fails, access cover 4 is removed. Next, retaining ring 17 is removed from output shaft 18. Thereafter, plate 6 can easily be removed from output shaft 18. With plate 6 removed, output shaft 18 is effectively disconnected from driven gear 12. The mechanism to which the sunroof or the like is attached to can then be actuated by hand by inserting an allen wrench or tool means in end 42 and rotating the same.

By reinstalling plate 6, retaining ring 17, and access cover 4 to the housing, the actuator is again ready to operate electrically.

Although the invention has been shown and described with respect to detailed embodiments thereof, it will be understood by those skilled in the art that various changes in the form and detail thereof may be made without departing from the spirit and scope of the invention.

We claim:

1. A powered actuator having a manual override feature comprising:

(a) an actuator housing;

(b) a motor means attached to the housing, said motor means having an armature and a first gear driven by the armature;

(c) a shaft extending through the housing, said shaft having a pinion end, an intermediate bearing surface and a plate end;

(d) a driven gear mounted upon a portion of the shaft the driven gear being positioned to coast with the first gear;

(e) an insert cushion engaged with the driven gear through bosses and cooperating recesses on the driven gear and insert cushion;

(f) a removable plate positioned to engage the plate end of said shaft and engage the insert cushion upon the removable plate being secured to the plate end of the shaft, the removable plate providing the sole driving connection between the insert cushion and the shaft.

* * * * *